UNITED STATES PATENT OFFICE.

ARTHUR EICHENGRÜN, OF ELBERFELD, GERMANY, ASSIGNOR TO THE FARBENFABRIKEN OF ELBERFELD COMPANY, OF NEW YORK.

PHARMACEUTICAL COMPOUND AND PROCESS OF MAKING SAME.

SPECIFICATION forming part of Letters Patent No. 622,455, dated April 4, 1899.

Application filed April 26, 1898. Serial No. 678,895. (No specimens.)

*To all whom it may concern:*

Be it known that I, ARTHUR EICHENGRÜN, doctor of philosophy and chemist, of Elberfeld, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

It is known that the reaction product which is obtained by the action of tannin on albumen compounds, and which may be termed as "tannin-albuminate," cannot be used for therapeutical purposes, because it is decomposed too easily by the action of dilute acids. I have now found that by treating the said product with formic aldehyde it is transformed into a new compound, which represents a very valuable remedy for intestinal diseases.

In carrying out my new process practically I can proceed as follows: A solution of 1.75 kilos, by weight, of egg-albumen in eight liters of water is mixed at ordinary temperature with a solution of 2.5 kilos, by weight, of tannin in five liters of water, the well-known tannin-albuminate being precipitated. Subsequently 0.5 liters of a watery solution of formic aldehyde (containing about forty per cent. of $CH_2O$) is added to the reaction mixture and the whole mixture is then heated on a water-bath for about ten hours while continuously stirring. During this operation the tannin-albuminate, being in the shape of a viscous precipitate, is by and by transformed into a granular mass, which represents my new product. The reaction will be finished when a test portion of the precipitate filtered off is found to be no longer at once soluble in a cold dilute caustic lye. At this stage the whole precipitate is filtered, washed with warm water in order to remove the free formic aldehyde still contained therein, and dried at about 50° to 60° centigrade.

When dry and pulverized, my new compound is a light yellow powder insoluble in water and in alcohol, ether, and benzene. In dilute caustic lyes it does not dissolve at once, only if it is treated for a long while with dilute caustic lyes it is by and by dissolved, undergoing decomposition.

My new product is not decomposed by dilute acids, and therefore it can be advantageously used as an intestinal astringent, exhibiting no detrimental action on the stomach. The approximate dose is from two to four grams a day.

On using other albumen compounds—such as serum albumen, vegetable albumen, or the like—instead of egg albumen the process proceeds in the same manner.

Having now described my invention and in what manner the same is to be performed, what I claim as new, and desire to secure by Letters Patent, is—

1. The process for producing a new pharmaceutical compound, consisting in introducing into a mixture of albumen and water a solution of tannin, and in warming the precipitate thus produced with a solution of formic aldehyde, by which means the viscous precipitate first obtained is transformed into a granular mass which is filtered off, pressed and dried, substantially as described.

2. As a new article of manufacture the new pharmaceutical compound obtainable from albumen, tannin and formaldehyde, which is a light yellowish powder insoluble in water, in alcohol, ether and benzin, but which is dissolved in dilute caustic alkalies after prolonged treatment, being at the same time decomposed under the formation of tannic acid, and which is not reacted upon by dilute acids, substantially as described.

In testimony whereof I have signed my name in the presence of two subscribing witnesses.

ARTHUR EICHENGRÜN.

Witnesses:
R. E. JAHN,
OTTO KÖNIG.